(12) United States Patent
Lamont et al.

(10) Patent No.: US 11,498,177 B2
(45) Date of Patent: Nov. 15, 2022

(54) POWER TOOL ANGLE ASSIST

(71) Applicant: MILWAUKEE ELECTRIC TOOL CORPORATION, Brookfield, WI (US)

(72) Inventors: Lance D. Lamont, Brookfield, WI (US); Jonathan E. Abbott, Milwaukee, WI (US); Jonathon R. Gasteiner, Brookfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 532 days.

(21) Appl. No.: 16/559,864

(22) Filed: Sep. 4, 2019

(65) Prior Publication Data

US 2020/0078898 A1 Mar. 12, 2020

Related U.S. Application Data

(60) Provisional application No. 62/729,077, filed on Sep. 10, 2018.

(51) Int. Cl.
| | | |
|---|---|---|
| *B23Q 17/22* | (2006.01) | |
| *B23Q 3/18* | (2006.01) | |
| B23D 59/00 | (2006.01) | |

(52) U.S. Cl.
CPC .......... *B23Q 17/225* (2013.01); *B23Q 3/186* (2013.01); *B23D 59/002* (2013.01)

(58) Field of Classification Search
CPC .... B23Q 17/225; B23Q 3/186; B23D 59/002; B27B 5/36
See application file for complete search history.

(56) References Cited

U.S. PATENT DOCUMENTS

| | | | | |
|---|---|---|---|---|
| 6,263,584 B1* | 7/2001 | Owens | ................... | B23Q 17/24 33/DIG. 1 |
| 7,182,148 B1* | 2/2007 | Szieff | ................... | B25H 1/0078 173/171 |
| 7,640,676 B1* | 1/2010 | Poole | ................... | G05B 19/401 33/630 |
| 7,874,077 B2* | 1/2011 | Borinato | ................. | B25F 5/021 33/285 |
| 9,114,494 B1* | 8/2015 | Mah | ..................... | B25H 1/0092 |
| 10,377,008 B2* | 8/2019 | Reese | .................... | B23Q 15/02 |
| 10,807,219 B2* | 10/2020 | Mueckl | ................... | B25B 23/00 |
| 2004/0040169 A1* | 3/2004 | Davis | ................... | B23D 59/002 33/640 |

(Continued)

*Primary Examiner* — Yaritza Guadalupe-McCall
(74) *Attorney, Agent, or Firm* — Michael Best & Friedrich LLP

(57) ABSTRACT

Power tool methods and systems are provided for aligning a power tool to implement an angled cut in a workpiece. The power tool includes a first distance sensor and a second distance sensor. The power tool measures a first distance to the workpiece with the first distance sensor and a second distance to the workpiece with the second distance sensor. The power tool calculates an angle between the power tool and the workpiece based on the first and second distances, and indicates the angle via an angle output indicator of the power tool. The power tool may measure an angle between the power tool and the workpiece using a proximate edge and a distal edge of the workpiece, and indicate whether the power tool maintains a correct angle as it traverses a cut through the workpiece from the proximate edge to the distal edge.

20 Claims, 8 Drawing Sheets

(56) References Cited

U.S. PATENT DOCUMENTS

| | | | |
|---|---|---|---|
| 2014/0000921 A1* | 1/2014 | Vanko | B23Q 17/22 173/11 |
| 2014/0166323 A1* | 6/2014 | Cooper | F16P 3/147 173/176 |
| 2017/0246732 A1* | 8/2017 | Dey, IV | B25B 21/026 |
| 2018/0065232 A1* | 3/2018 | Mueckl | G01S 15/42 |
| 2020/0078898 A1* | 3/2020 | Lamont | B23Q 3/186 |
| 2020/0171632 A1* | 6/2020 | Dey, IV | B25B 21/026 |
| 2021/0008697 A1* | 1/2021 | Mueckl | B25B 21/00 |
| 2021/0283759 A1* | 9/2021 | Merget | B25D 17/24 |

* cited by examiner

POWER TOOL ANGLE ASSIST

CROSS REFERENCE TO RELATED APPLICATIONS

This application claims the benefit of U.S. Provisional Patent Application No. 62/729,077, filed on Sep. 10, 2018, the contents of which is hereby incorporated by reference in its entirety.

TECHNICAL FIELD

The present disclosure relates to power tools. More specifically, the present disclosure relates to power tools having a system for assisting a user to cut or bore into a workpiece at a selected angle.

SUMMARY

In one embodiment, a method is provided for assisting an angled power tool operation. An electronic controller of a power tool measures a first distance to a workpiece with a first distance sensor of the power tool. The electronic controller measures a second distance to the workpiece with a second distance sensor of the power tool. The determines a first angle between the power tool and the workpiece based the first distance to the workpiece and the second distance to the workpiece, and indicates the first angle between the power tool and the workpiece with an angle output indicator of the power tool.

In one embodiment, a power tool is provided for implementing an angled cut. The power tool includes a housing, a first distance sensor supported by the housing, a second distance sensor supported by the housing, an angle output indicator, and a controller including an electronic processor and a memory. The memory stores instructions that when executed by the electronic processor configure the controller to measure a first distance to a workpiece with the first distance sensor of the power tool and measure a second distance to the workpiece with the second distance sensor of the power tool. The controller further determines a first angle between the power tool and the workpiece based the first distance to the workpiece and the second distance to the workpiece, and indicates the first angle between the power tool and the workpiece using the angle output indicator of the power tool.

In one embodiment, a method is provided for directing an angled cut with a power tool. The method includes measuring, by a controller of the power tool, a first distance to an edge of a workpiece with a first edge distance sensor, and measuring, by the controller, a second distance to the edge with a second edge distance sensor. The method further includes calculating, by the controller, an angle between the power tool and the edge based on the first distance and the second distance; and indicating, by the controller, the angle with an angle output indicator.

In another embodiment, a power tool is provided for implementing an angled cut. The power tool includes a housing, a first edge distance sensor supported by the housing, a second edge distance sensor supported by the housing, and an angle output indicator. The power tool further includes a controller including an electronic processor configured to execute program instructions and a memory storing program instructions executable by the electronic processor. The controller is configured to measure, with the first edge distance sensor, a first distance to an edge of a workpiece, and to measure, with the second edge distance sensor, a second distance to the edge of the workpiece. The controller is further configured to calculate an angle between the power tool and the edge based on the first distance and the second distance, and to indicate, with the angle output indicator, the angle between the power tool and the edge.

In some embodiments, a power tool for implementing an angled cut includes a housing, a battery pack received by an interface of the housing, a first distance sensor supported by the housing, a second distance sensor supported by the housing, an angle output indicator, and a controller supported by the housing. The controller includes an electronic processor and a memory that stores instructions that when executed by the electronic processor configure the controller. The controller is configured to measure a first distance to a workpiece with the first distance sensor of the power tool and measure a second distance to the workpiece with the second distance sensor of the power tool. The controller is further configured to determine a first angle between the power tool and the workpiece based the first distance to the workpiece and the second distance to the workpiece, and indicate the first angle between the power tool and the workpiece via the angle output indicator of the power tool.

In some embodiments, a power tool for implementing an angled cut includes a housing, a guard profile, a motor, a distance sensor supported by the housing, a gyroscope supported by the housing, and a controller supported by the housing. The controller includes an electronic processor and a memory storing instructions that when executed by the electronic processor configure the controller. The controller is configured to measure a distance to a first portion of a workpiece using the distance sensor of the power tool while a second portion of the workpiece is touching the guard profile and define a reference distance for the second portion of the workpiece that touches the guard profile. The controller is further configured to determine an angle between the power tool and the workpiece based on the distance to the first portion of the workpiece and the reference distance, and determine, based on an output signal from the gyroscope, whether the angle between the power tool and the workpiece changes during operation of the power tool.

In some embodiments, the controller is further configured to shut-off the motor when the output signal from the gyroscope indicates that the angle between the power tool and the workpiece changes during operation of the power tool.

In some embodiments, the power tool further includes a user interface supported by the housing, where the controller is further configured indicate via the user interface when the output signal from the gyroscope indicates that the angle between the power tool and the workpiece changes during operation of the power tool.

In some embodiments, a method for assisting an angled power tool operation includes measuring, by an electronic controller of the power tool, a distance to a first portion of a workpiece using a distance sensor of the power tool while a second portion of the workpiece is touching a guard profile of the power tool. The electronic controller further defines a reference distance for the second portion of the workpiece that touches the guard profile and determines an angle between the power tool and the workpiece based on the distance to the first portion of the workpiece and the reference distance. The electronic controller is further determines, based on an output signal from a gyroscope of the power tool, whether the angle between the power tool and the workpiece changes during operation of the power tool.

In some embodiments, a motor of the power tool is shut-off when the output signal from the gyroscope indicates that the angle between the power tool and the workpiece changes during operation of the power tool.

In some embodiments, when the output signal from the gyroscope indicates that the angle between the power tool and the workpiece changes during operation of the power tool it is indicated via a user interface of the power tool.

In some embodiments, a power tool for implementing an angled cut includes a housing, a guard profile, where the guard profile includes an alignment assist feature for aligning the power tool with a workpiece at a specified angle. The power tool also includes an operation trigger, a motor, a gyroscope supported by the housing, and a controller supported by the housing. The controller includes an electronic processor and a memory storing instructions that when executed by the electronic processor configure the controller. The controller is configured to receive a signal indicating that the power tool is aligned according to a desired angle relative to a workpiece, determine, based on a first output from the gyroscope, an initial orientation of the power tool relative to the workpiece, and activate the motor according to actuation of the operation trigger. The controller is further configured to determine, based on a second output from the gyroscope, a second orientation of the power tool relative to the workpiece while the power tool is in operation.

In some embodiments, the alignment assist feature for aligning the power tool with a workpiece at a specified angle includes a plurality of markings oriented at various angles on a transparent portion of the guard profile, or a plurality of slit apertures oriented at various angles on the guard profile.

In some embodiments, the signal indicating that the power tool is aligned according to a desired angle relative to a workpiece is received as a result of the actuation of the operation trigger.

In some embodiments, the power tool also includes an alignment-set user input, where the signal indicating that the power tool is aligned according to a desired angle relative to a workpiece is received as a result of the actuation of the alignment-set user input.

In some embodiments, the controller is further configured to shut-off the motor when the second output from the gyroscope indicates that the angle between the power tool and the workpiece changes during operation of the power tool.

In some embodiments, the power tool also includes a user interface supported by the housing and the controller is further configured indicate via the user interface when the second output from the gyroscope indicates that the angle between the power tool and the workpiece changes during operation of the power tool.

In some embodiments, a method for assisting an angled power tool operation includes receiving, by an electronic controller of the power tool, a signal indicating that the power tool is aligned according to a desired angle relative to a workpiece. The electronic controller determines, based on a first output signal from a gyroscope of the power tool, an initial orientation of the power tool relative to the workpiece and activates a motor of the power tool according to actuation of an operation trigger of the power tool. The electronic controller further determines, based on a second output signal from the gyroscope, a second orientation of the power tool relative to the workpiece while the power tool is in operation.

In some embodiments, an alignment assist feature, of the power tool, for aligning the power tool with the workpiece at the specified angle includes a plurality of markings oriented at various angles on a transparent portion of a guard profile of the power tool, or a plurality of slit apertures oriented at various angles on the guard profile of the power tool.

In some embodiments, the signal indicating that the power tool is aligned according to the desired angle relative to the workpiece is received as a result of the actuation of the operation trigger of the power tool.

In some embodiments, the signal indicating that the power tool is aligned according to the desired angle relative to the workpiece is received as a result of the actuation of an alignment-set user input of the power tool.

In some embodiments, the motor of the power tool is shut-off when the second output from the gyroscope indicates that the angle between the power tool and the workpiece changes during operation of the power tool.

In some embodiments, a user interface of the power tool indicates when the second output from the gyroscope indicates that the angle between the power tool and the workpiece changes during operation of the power tool.

In some embodiments, a power tool for implementing an angled cut includes a housing, a guard profile, a direction detector disposed on the guard profile, where the direction detector includes a ball bearing. The ball bearing rotates in a direction according to movement of a workpiece relative to the power tool when the workpiece is in contact with the ball bearing. The power tool further includes an operation trigger, a motor, and a controller supported by the housing. The controller includes an electronic processor and a memory that stores instructions that when executed by the electronic processor configure the controller. The controller is configured to activate the motor according to actuation of the operation trigger, and receive a first signal from the direction detector. The first signal indicates a first direction of the power tool relative to the workpiece as the power tool traverses the workpiece. The controller is further configured to receive a second signal from the direction detector, where the second signal indicates a second direction of the power tool relative to the workpiece as the power tool traverses the workpiece. The controller is further configured to compare the first direction of the power tool relative to the workpiece to the second direction of the power tool relative to the workpiece, and take a responsive action when the first direction of the power tool relative to the workpiece is different from the second direction of the power tool relative to the workpiece.

In some embodiments, the responsive action includes shutting-off the motor.

In some embodiments, the power tool also includes a user interface, where the responsive action includes indicating, via the user interface, that a direction of the power tool relative to the first direction of the power tool has changed.

In some embodiments, a method for assisting an angled power tool operation includes activating, by an electronic controller of the power tool, a motor of the power tool according to actuation of an operation trigger of the power tool. The method further includes receiving a first signal from a direction detector of the power tool, where the first signal indicates a first direction of the power tool relative to a workpiece as the power tool traverses the workpiece. The direction detector is disposed on a guard profile of the power tool and the direction detector includes a ball bearing that rotates in a direction according to movement of the workpiece relative to the power tool when the workpiece is in contact with the ball bearing. The method further includes receiving a second signal from the direction detector, where the second signal indicates a second direction of the power tool relative to the workpiece as the power tool traverses the workpiece. The controller is further configured to compare the first direction of the power tool relative to the workpiece to the second direction of the power tool relative to the workpiece, and take a responsive action when the first direction of the power tool relative to the workpiece is different from the second direction of the power tool relative to the workpiece.

In some embodiments, the responsive action includes shutting-off the motor.

In some embodiments, the responsive action includes indicating, via a user interface of the power tool, that a direction of the power tool relative to the first direction of the power tool has changed.

Other aspects of the disclosure will become apparent by consideration of the detailed description and accompanying drawings.

DETAILED DESCRIPTION

Figure 1A:
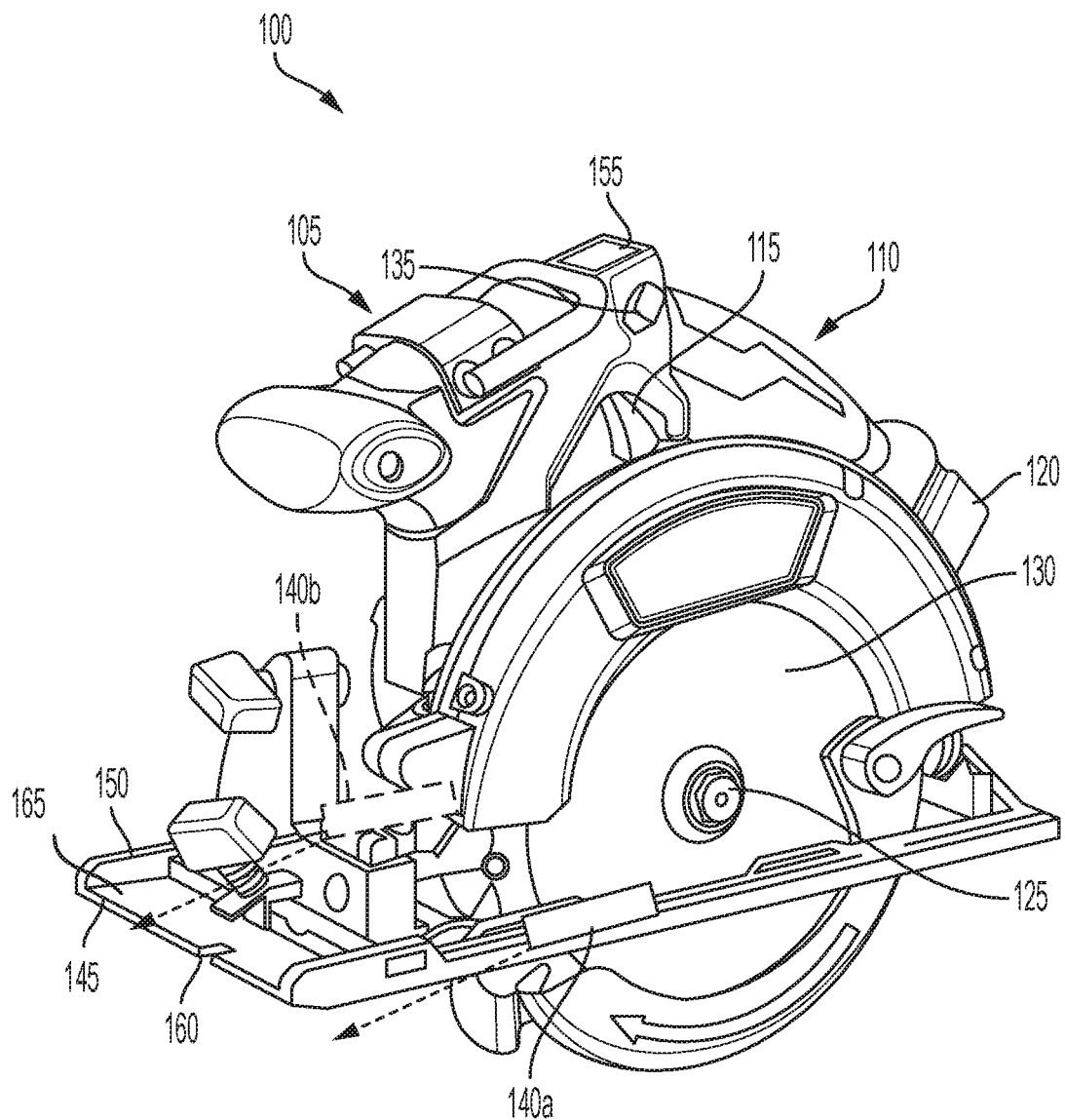
FIG. 1A illustrates a power tool with an alignment assist system, according to some embodiments.

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions. Terms of degree, such as "substantially" or "approximately" are understood by those of ordinary skill to refer to reasonable ranges outside of the given value, for example, general tolerances associated with manufacturing, assembly, and use of the described embodiments. For example, "substantially" can be defined as being within about 5 percent to about 10 percent of a given value.

Electric power tools receive power from a power source to drive a load. Some electric power tools are corded to receive power from an external power source, such as a power outlet positioned on a wall. Other electric power tools receive power from a battery pack. Battery-powered power tools allow for increased portability and convenience by eliminating the need for the electric cord anchored to the external power source.

Sawing or boring through a workpiece with a power tool at a particular angle may be a challenging task for a user. The user may make simple straight cuts unassisted using a power tool such as a circular saw. When making angled cuts, the user may employ a miter box and a hand-saw, which takes time to set-up and a diligent effort when sawing through a workpiece. When using a handheld tool, such as a power drill, guiding the tool to drill a bore in a workpiece at a particular angle may depend on the eye and skill of the user.

Systems and methods are provided herein for assisting a user to make a cut or bore into a workpiece at a desired angle using a power tool. In one embodiment, a guide system is provided for directing the user to make the angled cut at a predetermined or selected angle with a circular saw. For example, a pair of laser sensors may be configured on the power tool to detect a workpiece or an edge of the workpiece. Distances between the two sensors and the workpiece are measured and an angle of the workpiece relative to the power tool is determined. The angle is indicated to the user by the power tool. In this manner, a user can quickly align a power tool, such as a saw or drill, for a cut or bore at a desired angle. Further details and embodiments are described below FIG. 1 illustrates an example of a battery-powered power tool 100 including a guide system for directing an angled cut at a predetermined angle. In this example, the power tool 100 is a circular saw and may be referred to as the circular saw 100. However, in some embodiments, the power tool 100 is another type of power tool that contacts and acts on a workpiece at a predetermined angle, such as a drill-driver, impact driver, hammer drill, impact wrench, reciprocating saw, jigsaw, and the like. The power tool 100 includes a tool housing 105, a handle 110, a trigger 115, and a base 120 configured to receive a battery pack (e.g., battery pack 305 of FIG. 3). In some embodiments, the battery pack may be a rechargeable battery pack housing a plurality of battery cells and a battery controller configured to control the charging and discharging of the battery cells (e.g. via power switching elements). The plurality of battery cells may be lithium ion ("Li-ion") cells, Nickel-Cadmium ("Ni-Cad") cells, or cells of another chemistry type. In some embodiments, the power tool 100 may utilize an alternating current (AC) power source rather than, or in addition to, a battery pack, such as via an electric cord attached to the power tool 100 and an external AC power source.

In the illustrated embodiment, the power tool 100 receives power at the base 120 from the battery pack and drives an output shaft 125 configured to receive a circular saw blade 130. The base 120 may also be referred to as a battery interface. The circular saw blade is also referred to as a drivable accessory of the power tool 100. The output shaft 125 is also referred to as an arbor in the context of the circular saw 100, and as an output driver in the context of the power tool 100 more generally. In other embodiments, the power tool 100 may be configured as a drill-driver or other power tool including an output shaft 125 configured, for example, to receive a drivable accessory such as a tool bit. In yet further embodiments, the power tool 100 may be configured as a reciprocating saw or a jigsaw and the output shaft 125 is configured as a reciprocating output driver configured to receive a reciprocating saw blade. A safety switch 135 is positioned on the housing 105 and is operable to enable and disable control of the power tool 100 via the trigger 115. The power tool 100 further includes a first edge distance sensor 140a and a second edge distance sensor 140b (collectively, distance sensors 140) supported by the housing 105. The first edge distance sensor 140a and the second edge distance sensor 140b are supported by the housing in a generally rectilinear relationship. For example, the distance sensors are generally mounted parallel to each other and to the plane of the saw blade 130. In the illustrated embodiment, the distance sensors 140 are positioned equidistant from a front tool edge 145 of a guard profile 150 (also referred to as a guard plate or shoe) of the power tool 100, but, in other embodiments, the sensors are not equidistant from the front tool edge 145. In some embodiments, the distance sensors 140 are positioned equidistant from a reference line, a tool housing, or a component within the power tool 100, which is perpendicular to direction of the distance sensors and/or perpendicular to the direction of the action of a drivable accessory of the power tool into a work piece (e.g., perpendicular to a drill bit attached to an output driver of a power drill). In some embodiments, the power tool 100 includes a gyroscope (see FIG. 3). When the power tool 100 includes a gyroscope, it may be equipped with or utilize only one of the distance sensors 140 or neither of the distance sensors.

In some embodiments, the distance sensors 140 are laser distance sensors. In other embodiments, the distance sensors may be configured as ultrasonic sensors, inductive sensors, capacitive sensors, physical contact detectors or another type of proximity or distance sensor. In some embodiments, the power tool 100 may include more than two distance sensors 140 or other types of sensors. In some embodiments, the distance sensors are used to sense distance by determining a time of flight between transmitting a signal (e.g., a laser pulse) and receipt of a reflection of the signal, and multiplying a known velocity of the signal by the time of flight. The power tool 100 further includes an angle output indicator 155. In the illustrated embodiment, the angle output indicator 155 is configured as an LCD display, but, in other embodiments, the angle output indicator 155 is an audible, visual, and/or haptic angle output indicator, such as a speaker, one or more LEDs, vibration feedback, etc.

Figure 1B:
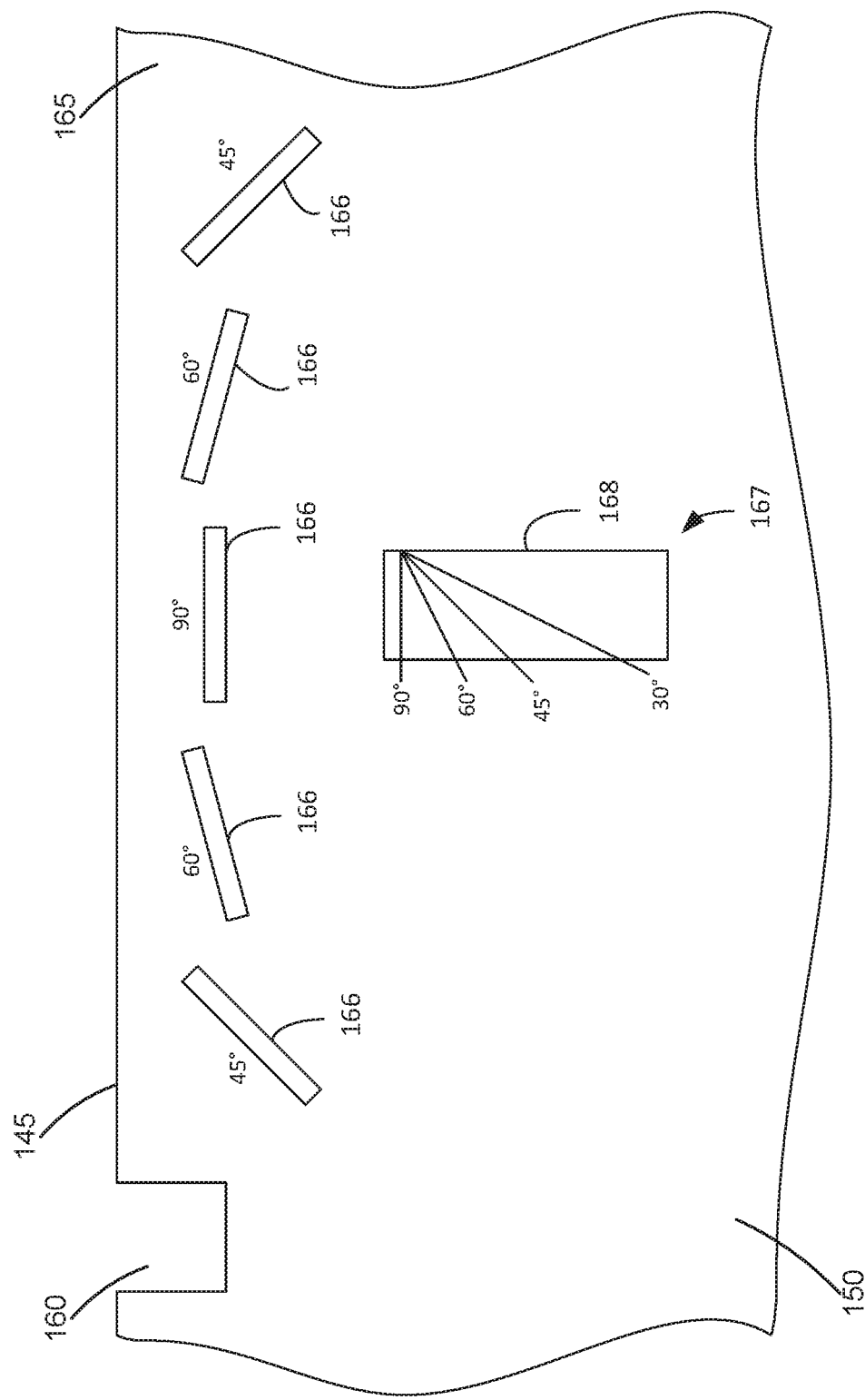
FIG. 1B illustrates a guard profile of the power tool of FIG. 1, according to some embodiments.

In some embodiments, as shown in FIG. 1B, a front portion 165 and the front tool edge 145 of the guard profile 150 includes one or more slit apertures 166, which are located near the edge 145 in front of the saw blade 130. The one or more slit apertures 166 may be oriented at various angles to allow a user to align the saw blade 130 at the various angles relative to a workpiece. As illustrated, the angles noted are with respect to the direction of cutting of the saw blade.

In some embodiments, as also shown in FIG. 1B, the guard profile 150 includes an alignment guide 167 including a translucent (or transparent) window 168, which is located near the edge 145 in front of the saw blade 130. The translucent window 168 enables a user to see the workpiece through the guard profile 150. The alignment guide 167 may include markings indicating various different angles to which a user can align the saw blade 130 to the workpiece 210. In some embodiments, rather than crossing over the window 168, the markings are to the side of the window 168, such as when the window 168 is a cut-out of the guard profile 150 without an inserted translucent or transparent element. In some embodiments, a user may select the angle-set switch 350 to indicate to the controller 325 when the saw blade 130 and the workpiece 212 are aligned for traversing the workpiece 212 at a desired angle.

Figure 2A:
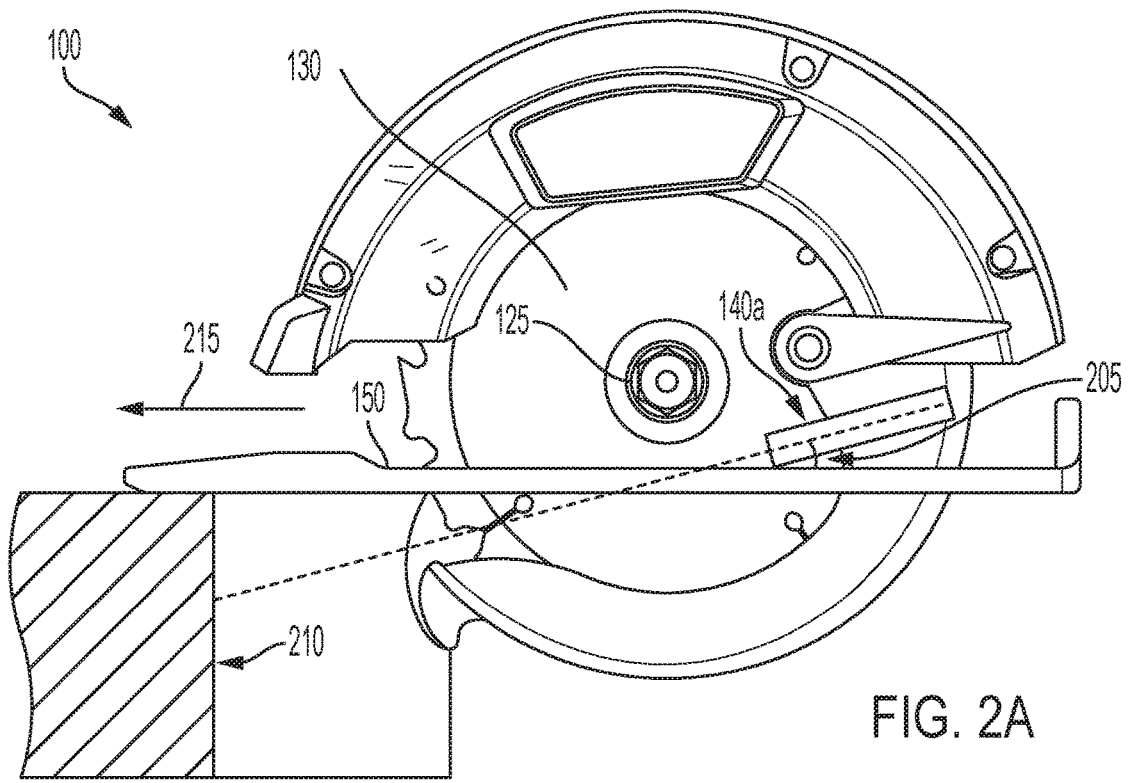
FIGS. 2A and 2B illustrate profile views of a portion the power tool of FIG. 1, according to some embodiments.

FIG. 2A is a diagrammatic profile view of the power tool 100. Saw blade 130 extends through a lower guard profile 150 supported by the housing (e.g. housing 105). The first edge distance sensor 140a is oriented substantially parallel to the plane of the saw blade 130, but may be oriented relative to the guard profile 150 by an angle 205. The second edge distance sensor (e.g. 140b) may additionally be oriented relative to the guard profile 150 by the angle 205. More generally, first and second distance sensor 140a and 140b may be oriented parallel to the action of a drivable accessory of the power tool 100 through a work piece, for example, parallel to the action of the saw blade 130 as shown by the arrow 215, or parallel to the action of a drill bit in a power drill 100 (see FIGS. 7A-7B). Alternatively, or in addition, one or both of the edge distance sensors 140 may be oriented differently relative to one or both of the saw blade 130 and the guard profile 150. Accordingly, based on a distance measured with the first edge distance sensor 140a, a distance can be measured between the power tool and, for example, an edge of a 2"×4" wooden stud or other type of workpiece 210. Similarly, based on a distance measured with the second edge distance sensor 140b, a distance can be measured between the power tool and, for example, an edge of the 2"×4" wooden stud or the other type of workpiece 210. Further, the distance between the edge of the workpiece 210 and the power tool 100 may be calculated based on, in addition to the distance measurements, one or both of a position and an orientation of the distance sensors 140 relative to the guard profile 150 or the housing 105 of the power tool 100.

Figure 2B:
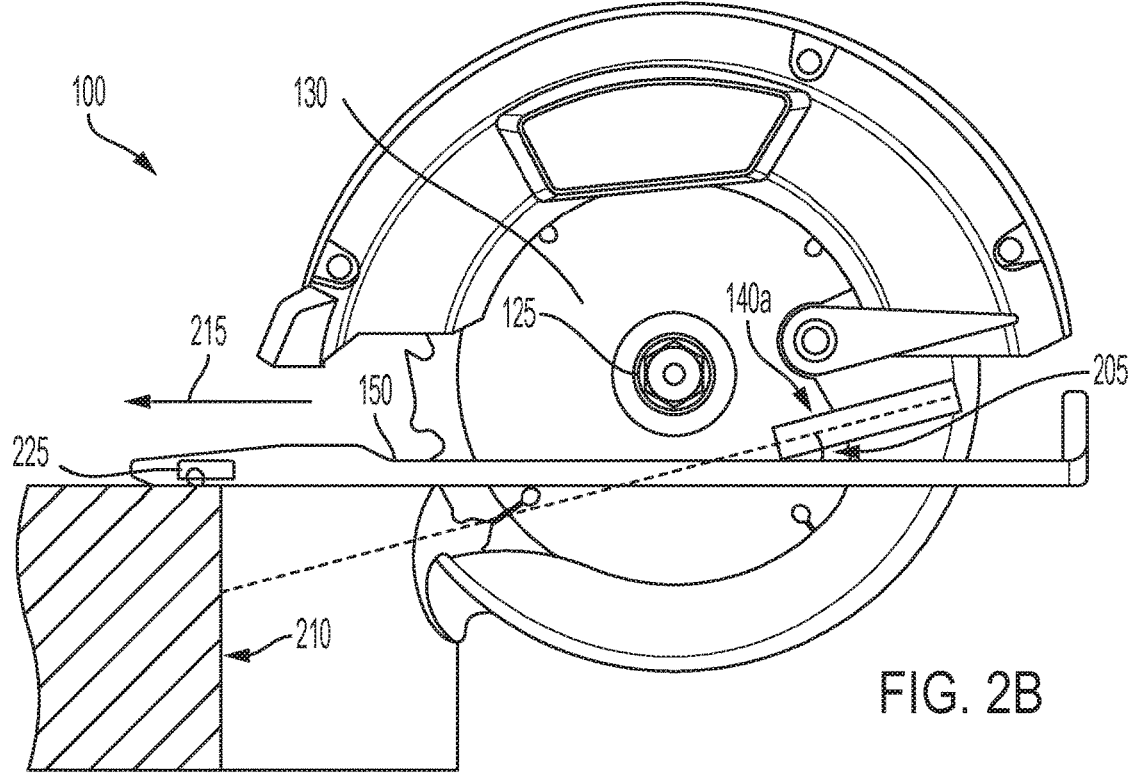

Referring to FIG. 2B, the guard profile 150 includes a ball bearing detector 225 for detecting the angle of movement of the workpiece 210 relative to the saw blade 130. The ball bearing detector is located in the front portion 165 of the guard profile 150 and includes a ball bearing that contacts the workpiece 210. The ball bearing rotates in a direction according to movement of the workpiece 210 relative to the orientation of the saw blade 130. The detector 225 transmits a signal to the controller 325 that indicates an angle and/or a change in angle of the workpiece 210 relative to the orientation of the saw blade 130. For example, the bearing detector may include a socket retaining the ball bearing, a first (x-axis) sensor configured to detect rotation of the ball bearing in a first direction along the plane of the guard profile 150 (e.g., the x-direction perpendicular to the cutting direction of the saw blade 130), and a second (y-axis) sensor configured to detect rotation of the ball bearing in a second direction along the plane of the guard profile 150 (e.g., the y-direction parallel to the cutting direction of the saw blade 130). The combined outputs of the first and second sensors, providing distance traveled by the ball bearing in the x- and y-direction, indicate the overall direction of movement along the plane defined by the guard profile 150. The first and second sensors may be, for example, rotary encoders that are rotated by movement of the ball bearing and output a signal indicative of the amount of rotation.

Figure 3:
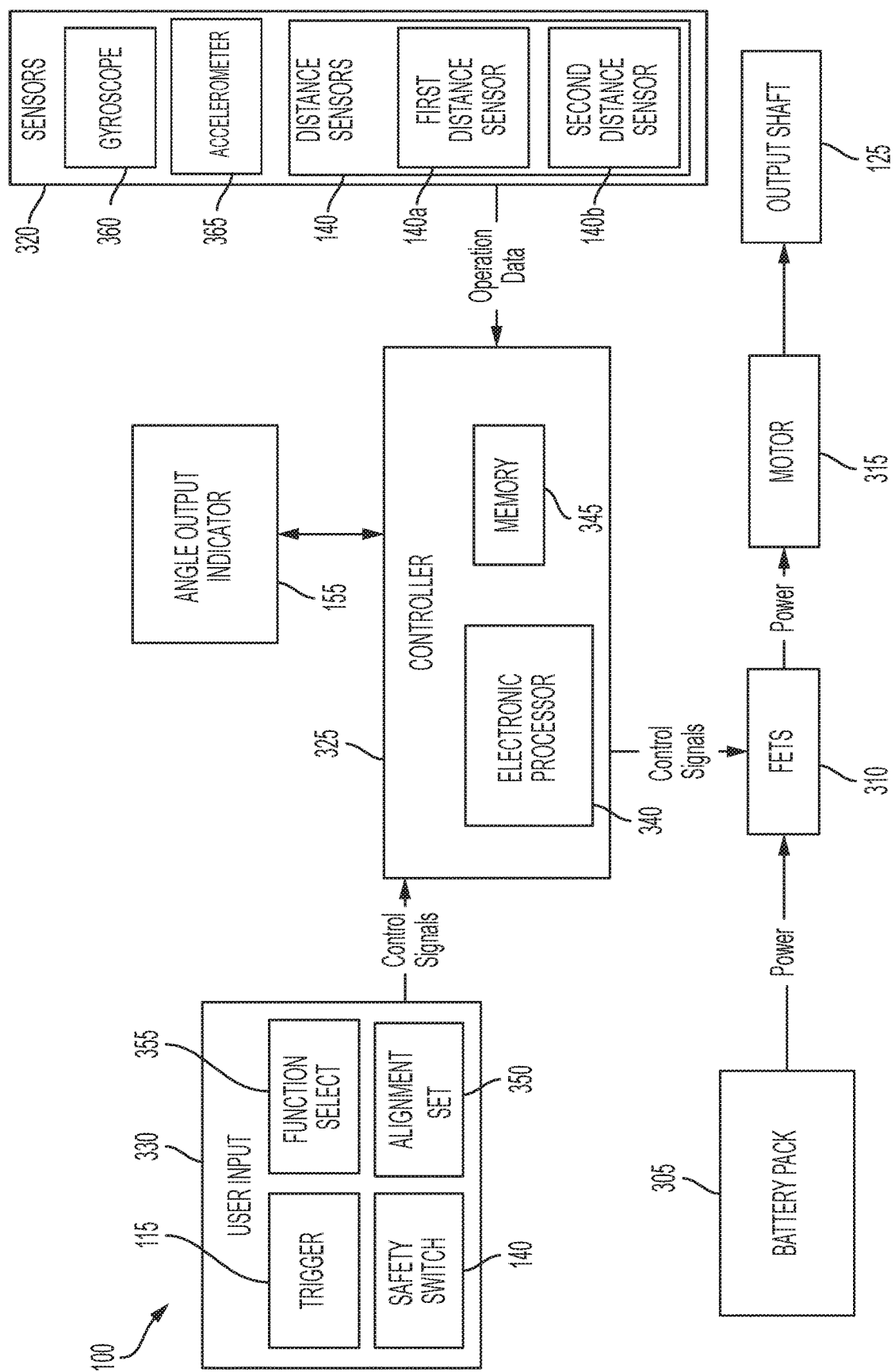
FIG. 3 is a block diagram of a power tool with an alignment assist system, according to some embodiments, such as the power tool of FIG. 1.

FIG. 3 is a block diagram of the example power tool 100 with the angle directing system of FIG. 1. As illustrated, the power tool 100 includes, among other things, a battery pack 305, field effect transistors (FETs) 310, a motor 315, the output shaft 125, and one or more of a plurality of sensors 320. The plurality of sensor 320 may include, the first edge distance sensor 140a, the second edge distance sensor 140b (collectively, distance sensors 140), a gyroscope 360, and an accelerometer 365. The power tool 100 further includes a controller 325, a user input 330, and the angle output indicator 155 (e.g., speaker, LEDs, display, vibration motor, etc.). The controller 325 may also be referred to as an electronic control unit 325 or a microcontroller and includes, among other things, an electronic processor 340 and a memory 345. In some embodiments, the memory 345 stores instructions that are executable by the electronic processor 340 to implement the functionality of the controller 325 described herein.

In the present embodiment, the user input 330 includes the trigger 115 and the safety switch 135, and the user input 330 generates control signals for the controller 325 in response to actuation of the safety switch 135 and depression of the trigger 115. In some embodiments, the user input 330 further includes an alignment-set switch 350 that may be set by a user to indicate that the power tool 100 is aligned at a desired angle relative to a workpiece. In some embodiments, the user input 330 further includes a function select switch 355, such as to control operation of the angle output indicator 155, for example, to select a desired or a predetermined angle. In some embodiments, a trigger 115 provides a control signal to the electronic processor 340. The trigger 115 may include, for example, a potentiometer providing a varying signal (e.g., between 0-5 volts) proportionally representing the amount of trigger depression. In some embodiments, the user input 330 may include other controlled user inputs or other styles of user inputs, which are not exhaustively detailed herein.

The control signals from the user input 330 are transmitted to the electronic processor 340, which activates the FETs 310 to draw power from the battery pack 305 and accurately drive the motor 315. By selectively enabling and disabling the FETs 310, power from the battery pack 305 is selectively applied to stator windings of the motor 315 to cause rotation of a rotor of the motor 315. The rotating rotor of the motor 315 drives the output shaft 125. Some of the sensors 320 provide motor information feedback (e.g., motor current information, motor rotational position information, motor rotational velocity information, etc.), which can be used by the controller 325 to drive the motor.

The gyroscope 360 and/or the accelerometer 365 are operable to detect when the saw blade 130 veers off course relative to a pre-determined or an initiated angle between the saw blade 130 and the workpiece 210. In some embodiments, the gyroscope 360 and/or the accelerometer 365 outputs a signal to the controller 325 to indicate that the saw blade 130 is off course.

Although not shown, the controller 325 and other components of the power tool 100 are also electrically coupled to and receive power from the battery pack 305. The FETs 310 may also be referred to as power switching elements 310.

Figure 4:
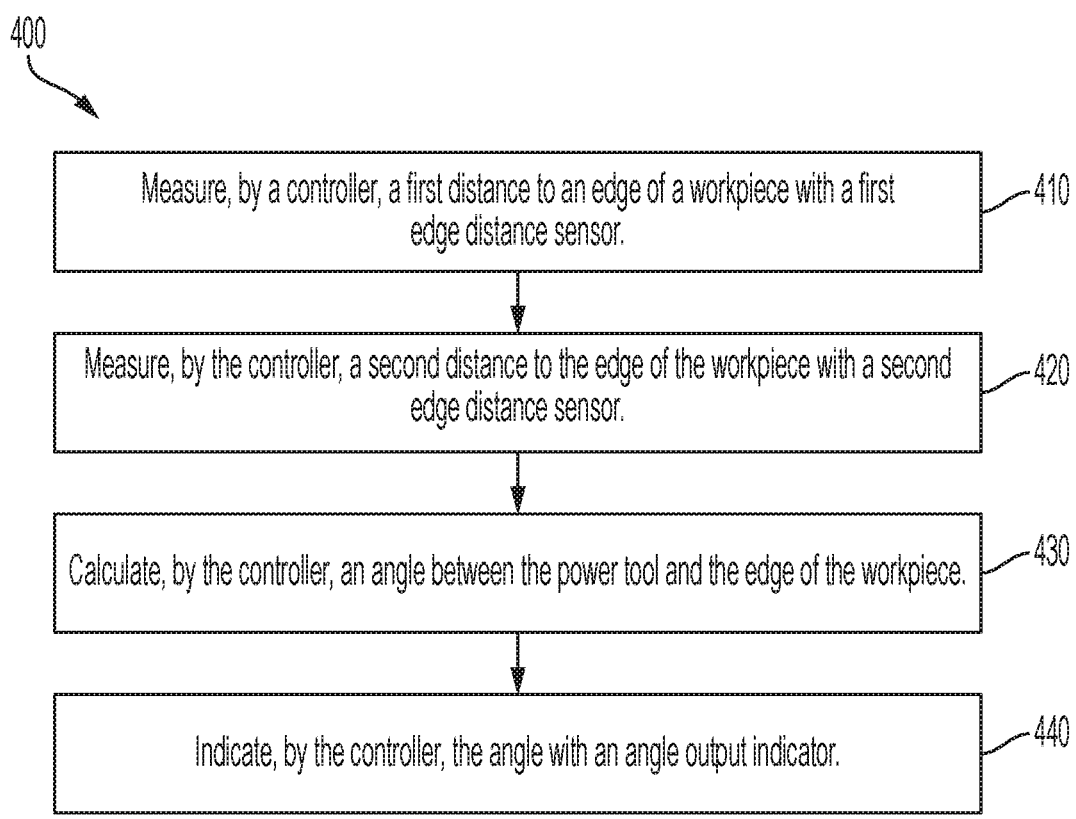
FIG. 4 is flow chart of a method of directing an angled cut at a predetermined angle using a power tool that has an alignment assist system, according to some embodiments.
Figure 5:
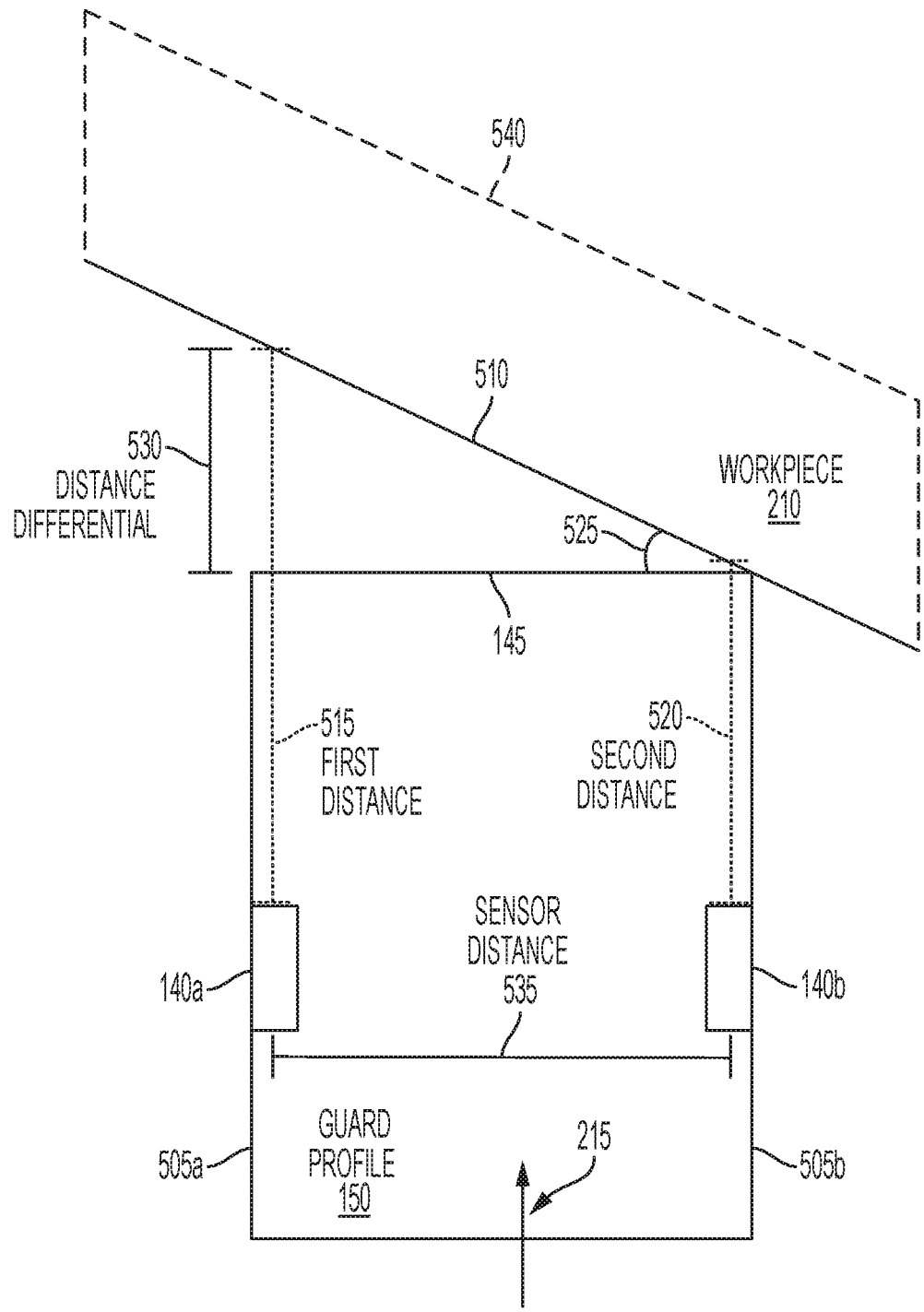
FIG. 5 is a diagram of an angled cut executed on a workpiece by the power tool of FIG. 1.

FIG. 4 is a flow diagram of a method 400 of directing an angled cut at a predetermined angle using a power tool that has an alignment assist system. The method 400 is described with reference to the power tool 100 described above. However, in some embodiments, the method is implemented using other power tools (see FIGS. 7A-7B). Additionally, the method 400 is described with reference to FIG. 5, which illustrates a diagram of an angled cut executed by the power tool 100 on the workpiece 210. As illustrated in FIG. 5, the guard profile 150 of the power tool 100 includes a first side 505a, a second side 505b, and the front tool edge 145. The first edge distance sensor 140a is mounted generally parallel (e.g., within 1-3 degrees of parallel, or another specified tolerance) to the first side 505a, and the second edge distance sensor 140b is mounted generally parallel to second side 505b. Further, in this embodiment, the first edge distance sensor 140a and the second edge distance sensor 140b are mounted equidistant from the front tool edge 145.

Returning to the method 400 of FIG. 4, in block 410, the controller 325 measures a first distance to an edge of a workpiece with the first edge distance sensor 140a. For example, with reference to FIG. 5, the controller 325 measures a first distance 515 from the first edge distance sensor 140a to a proximate edge 510 of the workpiece 210. Returning to the method 400 of FIG. 4, in block 420, the controller 325 measures a second distance to the edge of the workpiece 210 with the second edge distance sensor 140b. For example, with reference to FIG. 5, the controller 325 measures a second distance 520 from the second edge distance sensor 140b to the proximate edge 510 of the workpiece 210. In some embodiments, the first edge distance sensor 140a and the second edge distance sensor 140b may measure the distance to a surface of a workpiece to obtain a first distance and a second distance to the workpiece.

In block 430, the controller 325 calculates an angle between the power tool 100 and the edge of the workpiece based on the first distance and the second distance. For example, with reference to FIG. 5, the controller 325 is configured to calculate an angle 525 between the power tool 100 (e.g., the front tool edge 145) and the edge 510 based on the first distance 515 and the second distance 520. In one embodiment, the controller 325 uses a distance differential 530 and a sensor distance 535 (between the distance sensors 140a and 140b) to calculate the angle 525. More particularly, the controller 325 calculates the distance differential 530 by calculating the difference between the first distance 515 and the second distance 520. Additionally, the sensor distance 535 is, for example, a fixed value stored on the controller 325 during manufacturing or initial programming. In this example, the sensor distance 535 and the distance differential 530 intersect at a ninety degree angle. Accordingly, through the tangent trigonometric function, the controller 325 calculates the angle 525 (i.e., TAN (angle 525)=the distance differential 530/the sensor distance 535). In some embodiments, another angle may be desired and may be determined using the distance differential 530 and the sensor distance 535. For example, the controller 325 may calculate or derive an angle of the cut into the workpiece 210 (e.g., between the plane of the saw blade 130 and the edge 510 of the workpiece 210) by subtracting the angle 525 from 90° or 180°. In embodiments in which the first edge distance sensor 140*a* or the second edge distance sensor 140*b* are not parallel or are otherwise have altered orientations or positions, the trigonometric functions are updated to account for such orientations and positions.

In block 440, controller 325 indicates, with the angle output indicator 155, the angle between the power tool 100 (e.g., the front tool edge 145) and edge 510. Alternatively, the controller 325 may indicate, with the angle output indicator 155, the angle of the cut into the work piece 210 and the edge 510). For example, the angle output indicator 155 emits a visual indication, an audible indication, or a haptic indication that is indicative of the calculated angle. In some embodiments, the angle output indicator 155 displays the calculated angle on a display screen. In some embodiments, the angle output indicator 155 provides an indication at a predetermined angle (e.g. when the calculated angle is approximately 30-, 45-, 60-, or 90-degrees), such as a corresponding tone, frequency, vibration pattern, or other indication. In some embodiments, the method 400 may further include the controller 325 receiving a selection of the predetermined angle (e.g., before block 410) based on user input received at the function select switch 355 (e.g., an angle may be pre-set by a user).

In one embodiment, a user may pre-set an angle via the function select switch 355 and may tilt an edge of the workpiece 210 relative to the power tool 100 (e.g., relative to the front tool edge 145, to the plane of the blade 130, or to an output driver of a power tool 100) until a desired angle is reached. The controller 325 may then indicate, using the angle output indicator 155, when the angle reaches the pre-set angle, or whether or not the pre-set angle is maintained while sawing through the workpiece. In some embodiments, the controller 325 detects that the angle of the workpiece 210 is straying off course relative to a pre-set angle, and in response, shuts down the motor 315. The controller 325 may provide an indication to the user via the output indicator 155 (e.g., visual, audio, or other indication) regarding the angle error.

In some embodiments, the angle output indicator 155 indicates the angle by indicating a difference between the calculated angle and a predetermined angle, such as by including a set of LEDs indicating a rotational direction and magnitude for the power tool such that the calculated angle will reach the predetermined angle. In some embodiments, the method 400 may further include the controller 325 receiving a selection of the predetermined angle (e.g., before block 410) based on user input received at the function select switch 355.

Further, in some embodiments of the method 400, in blocks 410 and 420, the first edge distance sensor 140*a* and the second edge distance sensor 140*b* are configured to measure the distances to the distal edge 540 of the workpiece 210 in addition to or instead of the proximate edge 510. For example, with reference to FIG. 6, the controller 325 measures a first distance 605 from the first edge distance sensor 140*a* to the distal edge 540 of the workpiece 210 (block 410) and the controller 325 measures a second distance 610 from the second edge distance sensor 140*b* to the distal edge 540 of the workpiece 210. The controller 325 proceeds to execute the remainder of the method 400 using the first distance 605 and second distance 610 as previously described. More particularly, the controller 325 calculates the angle between the power tool 100 (e.g., the front tool edge 145) and the distal edge 540 of the workpiece 210 based on the first distance 605 and second distance 610 (block 430), and indicates the angle, with the angle output indicator 155, between the power tool 100 (e.g., the front tool edge 145) and the distal edge 540 (block 440). For example, with reference to FIG. 6, the controller 325 is configured to calculate an angle 635 between the power tool 100 and the distal edge 540 based on the first distance 605 and the second distance 610. In one embodiment, using similar functions as described above with respect to FIG. 5, the controller 325 uses a distance differential 630 and the sensor distance 535 to calculate the angle 635, where the controller 325 calculates the distance differential 630 by calculating the difference between the first distance 605 and the second distance 610, and the sensor distance 535 is a fixed value stored on the controller 325 during manufacturing or initial programming. For illustrative purposes in FIG. 6, the angle 635 is shown between the distal edge 540 and a line 640 that is parallel to the front tool edge 145. Alternatively, the controller 325 may calculate and/or indicate with the angle output indicator 155, an angle cut into the workpiece 210, or an angle between the plane of the saw blade 130 and the distal edge 540 of the workpiece.

Figure 6:
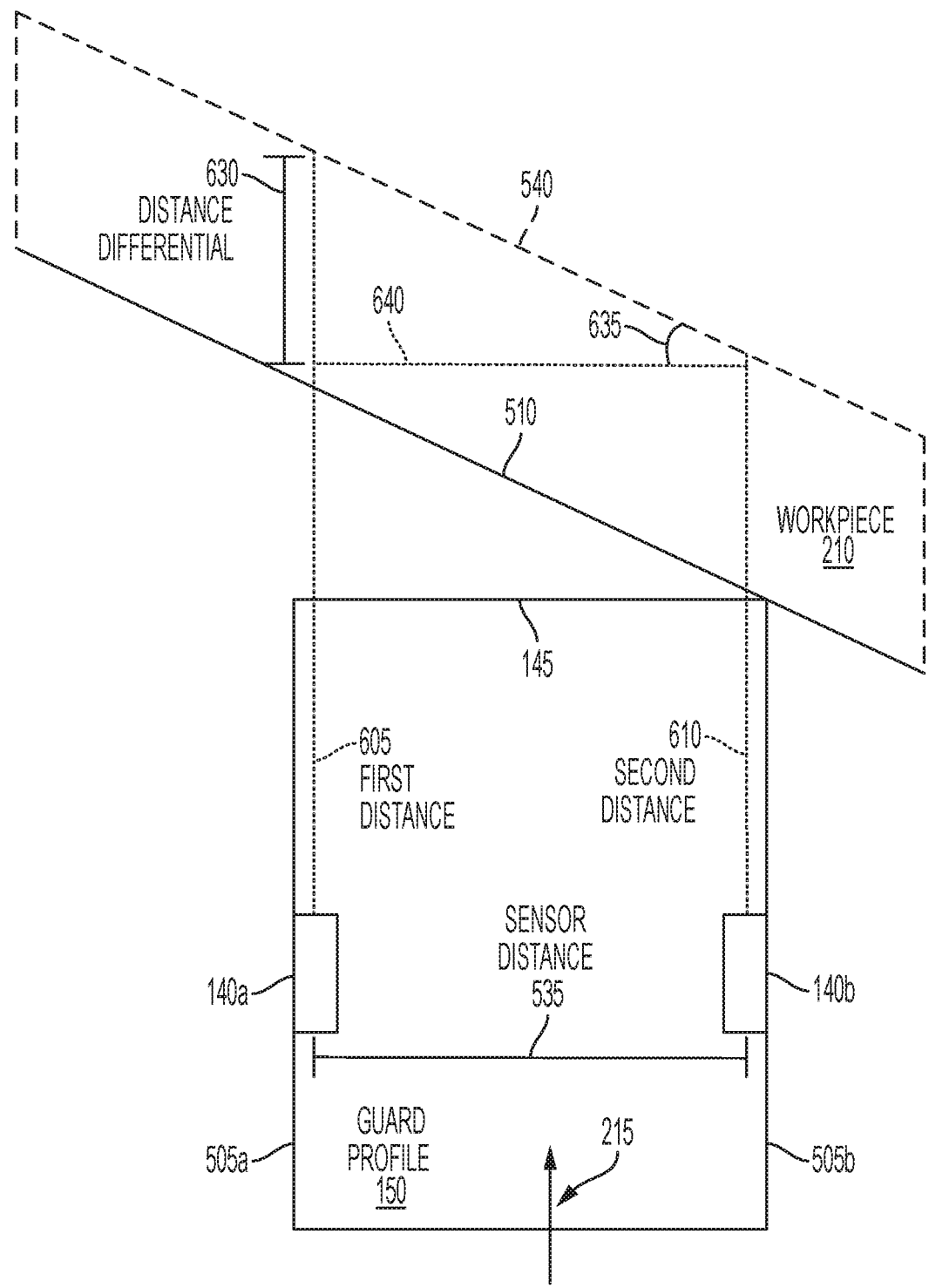
FIG. 6 is another diagram of an angled cut executed on a workpiece by the power tool of FIG. 1.

In some embodiments, the controller 325 executes the method 400 using the first and second distances to the proximate edge 510 to calculate the angle 525 between the power tool 100 and the proximate edge 510 (see FIG. 5), and also executes the method 400 using the first and second distances to the distal edge 540 to calculate the angle 635 between the power tool 100 and the distal edge 540 (see FIG. 6). In these embodiments, the two calculated angles may be averaged in block 430 and then the average angle may be indicated in block 440, or the second calculated angle may be used to confirm the accuracy of the first calculated angle. For example, to confirm the accuracy of the first calculated angle, the controller 325 may determine whether a difference between the first and second calculated angles are within a predetermined amount (e.g., within 5 or 10 degrees). When the controller 325 determines that the first and second calculated angles are within the predetermined amount, the accuracy of the first calculated angle is confirmed, and when not within the predetermined amount, the accuracy of the first calculated angle is not confirmed. In some embodiments, the controller 325 executes the method 400 using the first and second distances to the proximate edge 510 to calculate and indicate the angle 525 between the power tool and the proximate edge 510 (see FIG. 5); detects that first edge distance sensor 140*a*, the second edge distance sensor 140*b*, or both, passes the proximate edge 510 (e.g., based on the first distance 515 or the second distance 520 dropping below a threshold); and then executes the method 400 using the first distance 605 and second distance 610 to the distal edge 540 to calculate and indicate the angle 635 between the power tool and the distal edge 540 (see FIG. 6).

In some embodiments of the method 400, the controller 325 confirms that the calculated angle (e.g., the angle 525 in FIG. 5, the angle 635 in FIG. 6, or another calculated angle) remains within a predetermined threshold as the power tool 100 traverses between the proximate edge 510 and the distal edge 540 of the workpiece 210, and indicates via the angle output indicator 155 when the angle exceeds or falls below the predetermined threshold. In some embodiments, the controller 325 uses the edge distance sensors 140 to determine a relative velocity between the power tool 100 and the workpiece 210 by monitoring the measured distances relative to time. In some embodiments, the controller 325 indicates the relative velocity using the angle output indicator 155. In some embodiments of the method 400, the controller 325 drives the motor 315 based on user input at the trigger 115. In some embodiments of the method 400, the controller 325 begins the method 400 by executing the block 410 in response to detecting a user pull of the trigger 115.

In some embodiments of the method 400, the power tool 100 may include or utilize only one of the distance sensors 140 and include the gyroscope 360 to assist in the tool alignment. For example, a user can line one corner of the front tool edge 145 of the guard profile 150 up-against the work piece 210. The one distance sensor 140 may measure a first distance to a portion of the workpiece 210. A reference distance may be defined for the portion of the work piece that touches the corner of the front tool edge 145. The controller may determine the angle of the saw 130 relative to the work piece 210 based on the measured and reference distances. During operation of the power tool 100, the controller 325 may receive output signals from the gyroscope 360 that indicate whether the angle of the saw 130 relative to the work piece 210 is maintained as the saw blade 130 traverses the workpiece 210.

In some embodiments, neither of the distance sensors 140 are included or utilized in the power tool 100. For example, the power tool 100 may include the gyroscope 360 and/or accelerometer 365. The guard profile 150 may include the translucent portion including the alignment guide 167 with markings at various angles to enable users to align the saw blade 130 to the workpiece 210. Alternatively, another alignment mechanism such as the slit apertures 166 may be utilized. Once a user begins sawing the workpiece 210 at an initial angle between the saw blade 130 and the workpiece 210, the gyroscope 260 and/or accelerometer 365 may detect when the saw blade 130 veers off course, and in response, output a signal to the controller 325 indicating the angle error. In some embodiments, a user may set the alignment-set switch 350 to indicate to the controller 325 the initial angle when the saw blade 130 and the workpiece 212 are aligned for traversing the workpiece 212 at a desired angle. During operation, the controller 325 may shut-off the motor 315 when the orientation of the saw blade 130 changes direction relative to the original angle, and/or may indicate the angle error via the indicator 155. In some embodiments, the initial angle is a pre-set angle set by a user via the function select switch 355. The gyroscope 360 and/or accelerometer 365 may also work with one or both of the distance sensors 140 to detect when the orientation of the saw blade 130 changes direction from a pre-set or initial direction during operation.

In some embodiments, the guard profile 150 includes the ball bearing detector 225 for detecting the angle of movement of the workpiece 210 relative to the saw blade 130. Once a user begins sawing the workpiece 210 at an initial angle between the saw blade 130 and the workpiece 210, the ball bearing contacts the workpiece 210 and rotates in a direction according to movement of the workpiece 210 and relative to the orientation of the saw blade 130. The ball bearing detector 225 transmits a signal to the controller 325 that indicates an angle and/or a change in angle of the workpiece 210 relative to the orientation of the saw blade 130. If the ball bearing rotates off-axis relative to the initial angle or a pre-determined angle, the ball bearing detector 225 transmits a signal to the controller 325 indicating the angle error. In response to the signal, the controller 325 may shut-off the motor 315 and/or indicate the angle error via the indicator 155. In some embodiments, the initial angle between the saw blade 130 and the workpiece 210 is a pre-set angle set by a user via the function select switch 355. In some embodiments, the initial angle is aligned by a user using the angle alignment guide 167 or the slit apertures 166, for example.

In various embodiments described herein, the tool 100 and, in particular, the controller 325, is used and described as determining whether the saw blade 130 veers off course or changes direction relative to an initial or predetermined angle. In such embodiments, an angle threshold may be stored in the memory 345 and used by the electronic processor 240 in a comparison operation with a detected change in angle of the saw blade 130 (obtained using the various techniques described above) to determine whether a change in angle is sufficient to qualify as veering off course or changing in direction. For example, when the threshold is set at two degrees (2°), detected changes in direction that are below two degrees will not be determined to be indicative of the saw blade 130 veering off course or changing direction, while detected changes in direction at or above two degrees will indicate that the saw blade 130 is veering off course or changing direction. Other angle thresholds besides two degrees are used in some embodiments, such as one degree, three degrees, five degrees, and other values.

Figure 7A:
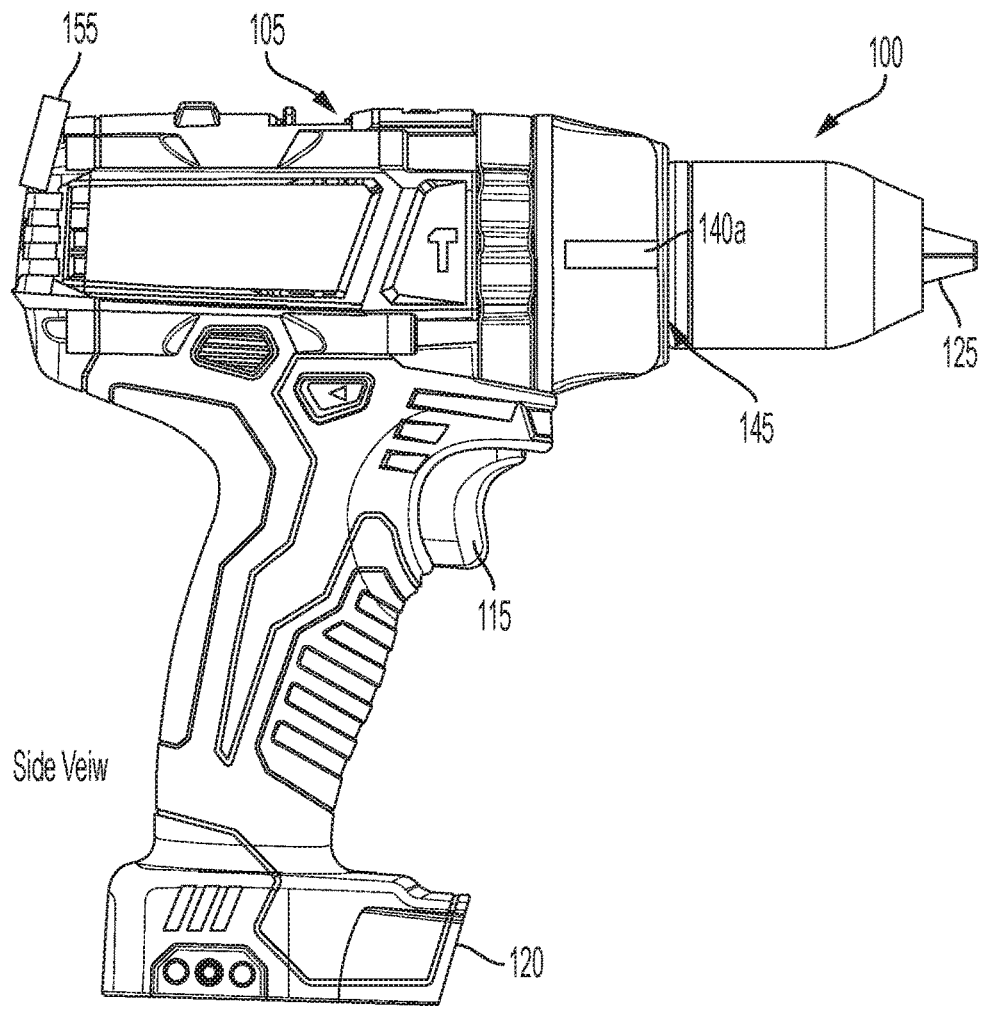
FIGS. 7A and 7B illustrate a power tool with an alignment assist system, according to some embodiments.
Figure 7B:
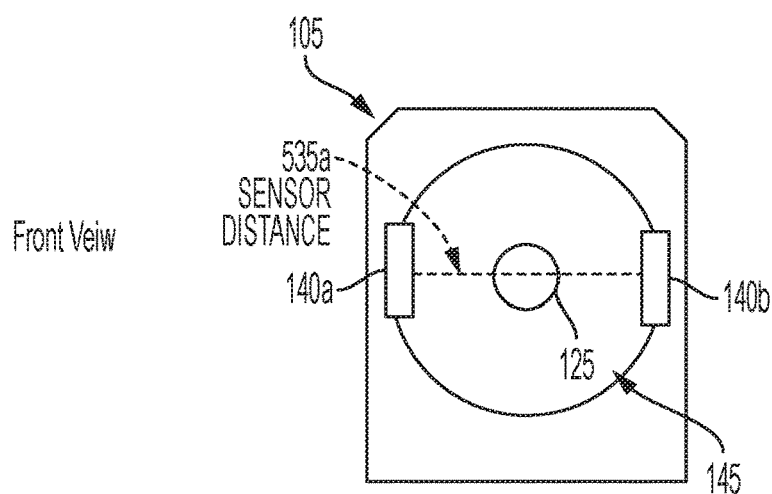

FIGS. 7A and 7B illustrate a power tool with an alignment assist system. As noted above, in some embodiments, a power tool 100 includes more than two distance sensors. FIGS. 7A and 7B, illustrate an embodiment of the power tool 100 including an alignment system that functions as described above with respect to the circular saw, but that is implemented in a power drill (i.e., the power drill 100). The power drill 100 includes the housing 105, the trigger 115, the base 120 configured to receive a battery pack, an output driver 125 configured to receive a drivable accessory such as a drill bit, the first distance sensor 140a, the second distance sensor 140b, and the angle output indicator 155. The first distance sensor 140a and second distance sensor 140b may be referred to as a first set of distance sensors 140. Also shown in FIG. 7B is a sensor distance 535a that represent the distance between the first set of distance sensors 140. The sensor distance 535a is analogous to the sensor distance 535 of FIGS. 5 and 6. The power drill 100 also includes the elements shown in the block diagram of FIG. 3.

Although the method 400 of the flow diagram in FIG. 4 applies to directing an angled cut at a predetermined angle, the method also applies to making a directed bore at a predetermined angle by the power drill 100. For example, in step 410, the controller 325 of the power drill 100 measures a first distance to an edge or a surface of a workpiece (not shown in FIGS. 7A and 7B) with the distance sensor 140a. In step 420, the controller 325 of the power drill 100 measures a second distance to the edge or the surface of the workpiece with the second distance sensor 140b. In step 430, the controller 325 calculates an angle between the power drill 100 (e.g., a drill bit received by the output driver 125) and the edge or the surface of the work piece. For example, the controller 325 uses a distance differential between the first distance and the second distance, and the sensor distance 535, to calculate and/or derive the angle between the power drill 100 and the workpiece. In step 440, the controller 325 indicates the angle by sending a signal to the angle output indicator 155. In this example, the line of the sensor distance 535a and a line of the distance differential (parallel to the drill bit) intersect at a ninety degree angle. Accordingly, as described above with respect to FIG. 5, the controller 325 calculates and/or derives the angle between the drill bit of the power drill 100 and the edge or surface of the workpiece using trigonometric functions with the geometry of the lines of the distance differential and the sensor distance 535a.

As described above, a user may pre-set an angle via the function select switch 355. For example, the user may tilt the power drill 100 relative to an edge or surface of a workpiece until a desired angle is reached. The controller 325 may indicate, using the angle output indicator 155, when the angle reaches the pre-set angle, or whether or not the pre-set angle is maintained while drilling through the workpiece. For example, if a user wants to drill perpendicularly into a workpiece in the horizontal direction, the user may set the function select switch 355 to 90° for the horizontal direction (i.e., measured by the first set of distance sensors 140a and 140b) and controller 325 may provide a visual or audible indication when the power drill is aligned perpendicularly to the workpiece, or may alert the user when the power drill 100 falls out of alignment. Although, FIGS. 7A and 7B illustrate a power tool 100 with one set of distance sensors 140, other orientations and/or additional sets of distances sensors may be included in a power tool to calculate and provide angle information to a user.

Thus, the disclosure provides, among other things, a system for directing an angled cut at a predetermined angle. Various features and advantages of the disclosure are set forth in the following claims.

We claim:

1. A power tool for implementing an angled cut, the power tool comprising:
   a housing;
   a first distance sensor supported by the housing;
   a second distance sensor supported by the housing;
   an angle output indicator; and
   a controller supported by the housing and including an electronic processor and a memory storing instructions that when executed by the electronic processor configure the controller to:
   measure a first distance to a workpiece with the first distance sensor of the power tool;
   measure a second distance to the workpiece with the second distance sensor of the power tool;
   determine a first angle between the power tool and the workpiece based on the first distance to the workpiece and the second distance to the workpiece; and
   indicate the first angle between the power tool and the workpiece via the angle output indicator of the power tool,
   wherein the first angle between the power tool and the workpiece is an angle between the power tool and an edge of the workpiece for making the angled cut.

2. The power tool of claim 1, wherein the first distance sensor and the second distance sensor are disposed substantially parallel to each other and at a known distance apart in the power tool.

3. The power tool of claim 1, wherein the first distance sensor and the second distance sensor are substantially parallel to a drivable accessory of the power tool.

4. The power tool of claim 1, wherein the first angle between the power tool and the workpiece indicated by the angle output indicator of the power tool is an angle relative to a drivable accessory of the power tool and the workpiece.

5. The power tool of claim 1, wherein the first distance to the workpiece is a distance to a proximate edge of the workpiece from the first distance sensor, and the second distance to the workpiece is a distance to the proximate edge of the workpiece from the second distance sensor.

6. The power tool of claim 1, wherein the first distance to the workpiece is a distance to a distal edge of the workpiece from the first distance sensor, and the second distance to the workpiece is a distance to the distal edge of the workpiece from the second distance sensor.

7. The power tool of claim 1, wherein the controller is further configured to:
   determine a second angle between the power tool and the workpiece based on a third distance to the workpiece and a fourth distance to the workpiece, and
   at least one selected from the group of:
   average the first angle and the second angle to indicate with the angle output indicator an average angle between the power tool and the workpiece;
   use the second angle to confirm accuracy of the first angle; and
   indicate via the angle output indicator whether one or both of the first angle and the second angle remain within a predetermined threshold as the power tool traverses between a proximate edge and a distal edge of the workpiece.

8. The power tool of claim 1, wherein the first distance sensor comprises one selected from the group comprising a laser sensor, an ultrasonic sensor, and a physical contact sensor, and the second distance sensor comprises one selected from the group comprising a laser sensor, an ultrasonic sensor, and a physical contact sensor.

9. A method for assisting an angled power tool operation, the method comprising:
   measuring, by an electronic controller of a power tool, a first distance to a workpiece with a first distance sensor of the power tool;
   measuring, by the electronic controller of the power tool, a second distance to the workpiece with a second distance sensor of the power tool;
   determining, by the electronic controller of the power tool, a first angle between the power tool and the workpiece based the first distance to the workpiece and the second distance to the workpiece; and
   indicating, by the electronic controller, the first angle between the power tool and the workpiece with an angle output indicator of the power tool,
   wherein the first angle between the power tool and the workpiece is an angle between the power tool and an edge of the workpiece for making an angled cut.

10. The method of claim 9, wherein the first distance sensor and the second distance sensor are disposed substantially parallel to each other and at a known distance apart on the power tool.

11. The method of claim 9, wherein the first distance sensor and the second distance sensor are substantially parallel to a drivable accessory of the power tool.

12. The method of claim 9, wherein the first angle between the power tool and the workpiece indicated by the angle output indicator of the power tool is an angle relative to a drivable accessory of the power tool and the workpiece.

13. The method of claim 9, wherein the first distance to the workpiece is a distance to a proximate edge of the workpiece from the first distance sensor, and the second distance to the workpiece is a distance to the proximate edge of the workpiece from the second distance sensor.

14. The method of claim 9, wherein the first distance to the workpiece is a distance to a distal edge of the workpiece from the first distance sensor, and the second distance to the workpiece is a distance to the distal edge of the workpiece from the second distance sensor.

15. The method of claim 9 further comprising,
determining, by the electronic controller, a second angle between the power tool and the workpiece based on a third distance to the workpiece and a fourth distance to the workpiece, and
at least one selected from the group of:
averaging, by the electronic controller, the first angle and the second angle and indicating an average angle between the power tool and the workpiece with the angle output indicator of the power tool;
confirming, by the electronic controller, accuracy of the first angle using the second angle; and
indicating, by the electronic controller, via the angle output indicator whether one or both of the first angle and the second angle remain within a predetermined threshold as the power tool traverses between a proximate edge and a distal edge of the workpiece.

16. The method of claim 9, wherein the first distance sensor comprises one selected from the group comprising a laser sensor, an ultrasonic sensor, and a physical contact sensor, and the second distance sensor comprises one selected from the group comprising a laser sensor, an ultrasonic sensor, and a physical contact sensor.

17. A power tool for implementing an angled cut, the power tool comprising:
a housing;
a battery pack received by an interface of the housing;
a first edge distance sensor supported by the housing;
a second edge distance sensor supported by the housing;
an angle output indicator; and
a controller including an electronic processor and a memory storing instructions that when executed by the electronic processor configure the controller to:
measure, with the first edge distance sensor, a first distance to an edge of a workpiece;
measure, with the second edge distance sensor, a second distance to the edge of the workpiece;
calculate an angle between the power tool and the edge of the workpiece based on the first distance and the second distance; and
indicate with the angle output indicator, the angle between the power tool and the edge of the workpiece.

18. The power tool of claim 17, wherein the edge of the workpiece is a proximate edge of the workpiece and the angle between the power tool and the proximate edge of the workpiece is a first angle between the power tool and the proximate edge of the workpiece, and the controller is further configured to
measure, with the first edge distance sensor, a third distance to a distal edge of the workpiece;
measure, with the second edge distance sensor, a fourth distance to the distal edge of the workpiece;
calculate a second angle between the power tool and the distal edge of the workpiece based on the third distance and the fourth distance; and
indicate with the angle output indicator, the second angle between the power tool and the distal edge of the workpiece.

19. The power tool of claim 17, wherein the controller is further configured to at least one selected from the group of:
average the first angle and the second angle and indicate with the angle output indicator an averaged angle between the power tool and the workpiece;
use the second angle to confirm accuracy of the first angle; and
indicate via the angle output indicator whether one or both of the first angle and the second angle remain within a predetermined threshold as the power tool traverses between the proximate edge and the distal edge of the workpiece.

20. The power tool of claim 17, wherein the edge of the workpiece is a distal edge of the workpiece.

* * * * *